United States Patent
Moulthrop, Jr. et al.

(10) Patent No.: US 6,887,601 B2
(45) Date of Patent: May 3, 2005

(54) REGENERATIVE ELECTROCHEMICAL CELL SYSTEM AND METHOD FOR USE THEREOF

(75) Inventors: Lawrence C. Moulthrop, Jr., Windsor, CT (US); Trent M. Molter, Glastonbury, CT (US); A. John Speranza, West Hartford, CT (US); Mark A. Lillis, South Windsor, CT (US); William Smith, Suffield, CT (US); Jason Shiepe, Middletown, CT (US); Thomas M. Skoczylas, Guilford, CT (US)

(73) Assignee: Proton Energy Systems, Inc., Rocky Hill, CT (US)

( * ) Notice: Subject to any disclaimer, the term of this patent is extended or adjusted under 35 U.S.C. 154(b) by 432 days.

(21) Appl. No.: 09/966,727

(22) Filed: Sep. 28, 2001

(65) Prior Publication Data

US 2002/0051898 A1 May 2, 2002

Related U.S. Application Data

(60) Provisional application No. 60/236,278, filed on Sep. 28, 2000.

(51) Int. Cl.$^7$ .............................. H01M 8/18; H01M 8/04
(52) U.S. Cl. .............................. 429/17; 429/21; 429/26
(58) Field of Search .............................. 429/17, 21, 24, 429/25, 26

(56) References Cited

U.S. PATENT DOCUMENTS

| | | | |
|---|---|---|---|
| 3,484,617 A | 12/1969 | Winsel | 290/44 |
| 3,754,147 A | 8/1973 | Hancock et al. | 290/53 |
| 4,184,084 A | 1/1980 | Crehore | 290/55 |

(Continued)

FOREIGN PATENT DOCUMENTS

| | | | |
|---|---|---|---|
| DE | 195 33 097 A1 | 3/1997 | ............ H01M/8/06 |
| DE | 197 31 250 A1 | 1/1998 | ............ H01M/10/44 |
| DE | 199 27 849 A1 | 12/1999 | ............ H01M/8/00 |
| EP | 0 472 922 A2 | 3/1992 | ............ H01M/8/18 |
| EP | 0 755 088 A2 | 1/1997 | ............ H01M/8/18 |
| EP | 0 878 859 A1 | 11/1998 | ............ H01M/8/04 |
| EP | 1 006 601 A2 | 12/1999 | ............ H01M/8/04 |
| WO | WO 99/44254 | 9/1999 | ............ H01M/8/10 |

OTHER PUBLICATIONS

Patent Abstract for DE19731250.
Patent Abstract for JP10055816.

(Continued)

*Primary Examiner*—Stephen J. Kalafut
(74) *Attorney, Agent, or Firm*—Cantor Colburn LLP

(57) ABSTRACT

An exemplary embodiment of the regenerative electrochemical cell system comprises: a fuel cell module comprising a fuel cell oxygen inlet in fluid communication with a water storage device, and a fuel cell hydrogen inlet in fluid communication with both an oxygen source and with a gaseous portion of an water phase separation device; an electrolysis module comprising an electrolysis water inlet in fluid communication with the water storage device via a fuel cell oxygen outlet, and an electrolysis water outlet in fluid communication with the fuel cell hydrogen.

One of the embodiments for operating a regenerative electrochemical cell system disclosed herein, comprises: introducing feed hydrogen from a hydrogen storage system to a fuel cell hydrogen electrode and introducing feed oxygen from an oxygen/water phase separation device to a fuel cell oxygen electrode; reacting hydrogen ions with the oxygen to generate electricity and water; once the fuel cell has attained operating conditions, ceasing the feed oxygen from the oxygen/water phase separation device, and introducing second oxygen from a surrounding atmosphere module to the fuel cell oxygen electrode; directing the water to a water storage device; introducing water to an electrolysis water electrode and power to an electrolysis module, to produce refuel hydrogen and oxygen; and directing the refuel hydrogen to the hydrogen storage device.

67 Claims, 3 Drawing Sheets

U.S. PATENT DOCUMENTS

| | | | | |
|---|---|---|---|---|
| 4,302,684 A | * | 11/1981 | Gogins | 290/55 |
| 4,335,093 A | | 6/1982 | Salomon | 423/644 |
| 4,839,247 A | | 6/1989 | Levy et al. | 429/21 |
| 5,312,699 A | | 5/1994 | Yanagi et al. | 429/22 |
| 5,376,470 A | | 12/1994 | Sprouse | 429/19 |
| 5,407,756 A | | 4/1995 | Sprouse | 429/12 |
| 5,443,804 A | * | 8/1995 | Parker et al. | 423/230 |
| 5,506,066 A | | 4/1996 | Sprouse | 429/21 |
| 5,510,202 A | | 4/1996 | McCoy et al. | 429/19 |
| 5,512,787 A | | 4/1996 | Dederick | 290/4 R |
| 5,592,028 A | | 1/1997 | Pritchard | 290/55 |
| 5,900,330 A | | 5/1999 | Kagatani | 429/17 |
| 5,980,726 A | * | 11/1999 | Moulthrop et al. | 205/637 |
| 5,985,474 A | * | 11/1999 | Chen et al. | 429/17 |
| 6,007,930 A | | 12/1999 | Adams et al. | 429/13 |
| 6,033,793 A | | 3/2000 | Woods et al. | 429/17 |
| 6,054,229 A | | 4/2000 | Hsu et al. | 429/26 |
| 6,093,500 A | | 7/2000 | Margiott et al. | 429/13 |
| 6,541,141 B1 | * | 4/2003 | Frank et al. | 429/17 |

OTHER PUBLICATIONS

International Search Report, International Application No. PCT/US 01/30394; International Filing Date Sep. 28, 2001; Date of Mailing Feb. 25, 2003.

International Search Report, International Application No. PCT/ US 01/ 30394, International Filing Date Sep. 28, 2001, Date of Mailing May 21, 2002, 8 pages.

* cited by examiner

REGENERATIVE ELECTROCHEMICAL CELL SYSTEM AND METHOD FOR USE THEREOF

CROSS REFERENCE TO RELATED APPLICATION

This application claims the benefit of the filing date of U.S. Provisional Application Ser. No. 60/236,278 filed Sep. 28, 2000, the entire contents of which are hereby incorporated by reference.

FIELD OF THE INVENTION

This disclosure relates generally to electrochemical cell systems, and especially relates to regenerative electrochemical cell systems.

BRIEF DESCRIPTION OF THE RELATED ART

Electrochemical cells are energy conversion devices, usually classified as either electrolysis cells or fuel cells. A proton exchange membrane electrolysis cell can function as a hydrogen generator by electrolytically decomposing water to produce hydrogen and oxygen gas, and can function as a fuel cell by electrochemically reacting hydrogen with oxygen to generate electricity. Referring to FIG. 1, which is a partial section of a typical anode feed electrolysis cell 100, process water 102 is fed into cell 100 on the side of an oxygen electrode (anode) 116 to form oxygen gas 104, electrons, and hydrogen ions (protons) 106. The reaction is facilitated by the positive terminal of a power source 120 electrically connected to anode 116 and the negative terminal of power source 120 connected to a hydrogen electrode (cathode) 114. The oxygen gas 104, and a portion of the process water 108, exit cell 100, while protons 106 and water 110 migrate across a proton exchange membrane 118 to cathode 114 where hydrogen gas 112 is formed. The hydrogen gas 112 and the migrated water 110 exit cell 100 from the cathode side of the cell 100.

Another typical water electrolysis cell using the same configuration as is shown in FIG. 1 is a cathode feed cell, wherein process water is fed on the side of the hydrogen electrode. A portion of the water migrates from the cathode across the membrane to the anode where hydrogen ions and oxygen gas are formed due to the reaction facilitated by connection with a power source across the anode and cathode. A portion of the process water exits the cell at the cathode side without passing through the membrane, while some excess water, as well as oxygen gas, exit the cell at the anode side.

A typical fuel cell uses the same general configuration as is shown in FIG. 1. Hydrogen gas is introduced to the hydrogen electrode (the anode in fuel cells), while oxygen, or an oxygen-containing gas such as air, is introduced to the oxygen electrode (the cathode in fuel cells). Hydrogen gas electrochemically reacts at the anode to produce protons and electrons, wherein the electrons flow from the anode through an electrically connected external load, and the protons migrate through the membrane to the cathode. At the cathode, the protons and electrons react with oxygen to form water, which additionally includes any feed water that is dragged through the membrane to the cathode. The electrical potential across the anode and the cathode can be exploited to power an external load.

In other embodiments, one or more electrochemical cells can be used within a system to both electrolyze water to produce hydrogen and oxygen, and to produce electricity by converting hydrogen and oxygen back into water as needed. Such systems are commonly referred to as regenerative fuel cell systems. Where a single electrochemical stack is used, it can be run in either fuel cell mode or electrolysis mode. Fuel cell mode is used when power is required, and electrolysis mode is used to regenerate hydrogen supplies when needed. During power generation in these regenerative fuel cell systems, hydrogen is typically supplied to the anode and oxygen to the cathode, with water forming at the cell cathode from oxidation of the hydrogen. Conversely, during charging operations, water is typically applied to the oxygen electrode (anode), with oxygen being extracted from the anode, and hydrogen being extracted from the hydrogen electrode (cathode).

What is needed in the art is a regenerative electrochemical system and a method for use thereof.

SUMMARY OF THE INVENTION

Disclosed herein are regenerative electrochemical cell systems and methods for use thereof. An exemplary embodiment of the regenerative electrochemical cell system comprises: a fuel cell module comprising a fuel cell oxygen inlet in fluid communication a water storage device, and a fuel cell hydrogen inlet in fluid communication with both an oxygen source and with a gaseous portion of an water phase separation device; an electrolysis module comprising an electrolysis water inlet in fluid communication with the water storage device via a fuel cell oxygen outlet, and an electrolysis water outlet in fluid communication with the fuel cell hydrogen.

Another embodiment of the electrochemical regenerative cell system comprises: a first conduit in fluid communication with a hydrogen storage device and a dryer; a first pressure regulator disposed in the first conduit between the hydrogen storage device and the dryer, the pressure regulator being effective to reduce a pressure of a gas stream discharged from the storage device into the dryer apparatus during a purging process to remove moisture from the dryer; a second conduit in fluid communication with the fuel cell module and at least one of the hydrogen storage device and the dryer; and a second pressure regulator disposed in the second conduit, wherein a pressure rating for the first pressure regulator is equal to or greater than a pressure rating for the second pressure regulator.

One embodiment for operating a regenerative electrochemical cell system, comprises: introducing feed hydrogen from a hydrogen storage system to a fuel cell hydrogen electrode and introducing feed oxygen from an oxygen/water phase separation device to a fuel cell oxygen electrode; reacting hydrogen ions with the oxygen to generate electricity and water; once the fuel cell has attained operating conditions, ceasing the feed oxygen from the oxygen/water phase separation device, and introducing second oxygen from a surrounding atmosphere module to the fuel cell oxygen electrode; directing the water to a water storage device; introducing water to an electrolysis water electrode and power to an electrolysis module, to produce refuel hydrogen and oxygen; and directing the refuel hydrogen to the hydrogen storage device.

Another embodiment for a method for operating a regenerative electrochemical cell system, which may be used alone or in combination with other methods, comprises: maintaining a fuel cell in a ready condition such that the fuel cell attains an operating temperature in less than or equal to about 1 minute; introducing hydrogen to a fuel cell hydrogen electrode and oxygen to a fuel cell oxygen electrode; forming hydrogen ions and electrons at the fuel cell hydrogen electrodes; passing the electrodes through a load to the fuel cell oxygen electrode; and reacting the hydrogen ions with the oxygen at the fuel cell oxygen electrode to form water.

Yet another embodiment for a method for operating a regenerative electrochemical cell system, which may be used alone or in combination with other methods, comprises: introducing feed hydrogen from a hydrogen storage device to a fuel cell hydrogen electrode and introducing feed oxygen to a fuel cell oxygen electrode; reacting hydrogen ions with the oxygen to generate electricity and water; introducing an oxygen/water stream from the fuel cell oxygen electrode through a vortex tube to produce a hot stream and a cool stream; introducing the cool stream to a phase separation device.

A further embodiment for a method for operating a regenerative electrochemical cell system, which may be used alone or in combination with other methods, comprises: introducing water to an electrolysis water electrode and power to an electrolysis module, to produce refuel hydrogen and oxygen; directing the refuel hydrogen through a hydrogen storage system consisting essentially of a hydrogen/water phase separation device and an inverted hydrogen storage device, wherein the refuel hydrogen passes from the electrolysis module, through the hydrogen/water phase separation device, past the shut off valve, and into the inverted hydrogen storage device; hydrating and fueling a fuel cell module by directing the refuel hydrogen and water from the inverted hydrogen storage device through the hydrogen/water phase separation device, and to a fuel cell hydrogen electrode; introducing oxygen to a fuel cell oxygen electrode; and producing water and electricity.

Another embodiment for a method for operating a regenerative electrochemical cell system, which may be used alone or in combination with other methods, comprises: introducing water to an electrolysis water electrode and power to an electrolysis module, to produce refuel hydrogen and oxygen; directing the refuel hydrogen through a hydrogen/water phase separation device and a dryer and into a hydrogen storage device at a pressure, wherein the dryer removes dryer water from the refuel hydrogen to form a dryer hydrogen; hydrating and fueling a fuel cell module by reducing the pressure of the dryer hydrogen to a reduced pressure; passing the dryer hydrogen through the dryer; removing dryer water from the dryer to form a hydrated hydrogen; directing the hydrated hydrogen to a fuel cell hydrogen electrode of a fuel cell module; introducing oxygen to a fuel cell oxygen electrode; and producing water and electricity.

An even further embodiment for a method for operating a regenerative electrochemical cell system, which may be used alone or in combination with other methods, comprises: maintaining a fuel cell such that the fuel cell attains an operating temperature in less than or equal to about 1 minute; introducing hydrogen to a fuel cell hydrogen electrode and oxygen to a fuel cell oxygen electrode; forming hydrogen ions and electrons at the fuel cell hydrogen electrodes; passing the electrodes through a load to the fuel cell oxygen electrode; and reacting the hydrogen ions with the oxygen at the fuel cell oxygen electrode to form water and electricity.

The above discussed and other features will be appreciated and understood by those skilled in the art from the following detailed description and drawings.

BRIEF DESCRIPTION OF THE DRAWINGS

Referring now to the drawings, which are meant to be exemplary and not limiting, and wherein like elements are numbered alike.

DETAILED DESCRIPTION OF THE PREFERRED EMBODIMENTS

Figure 1:
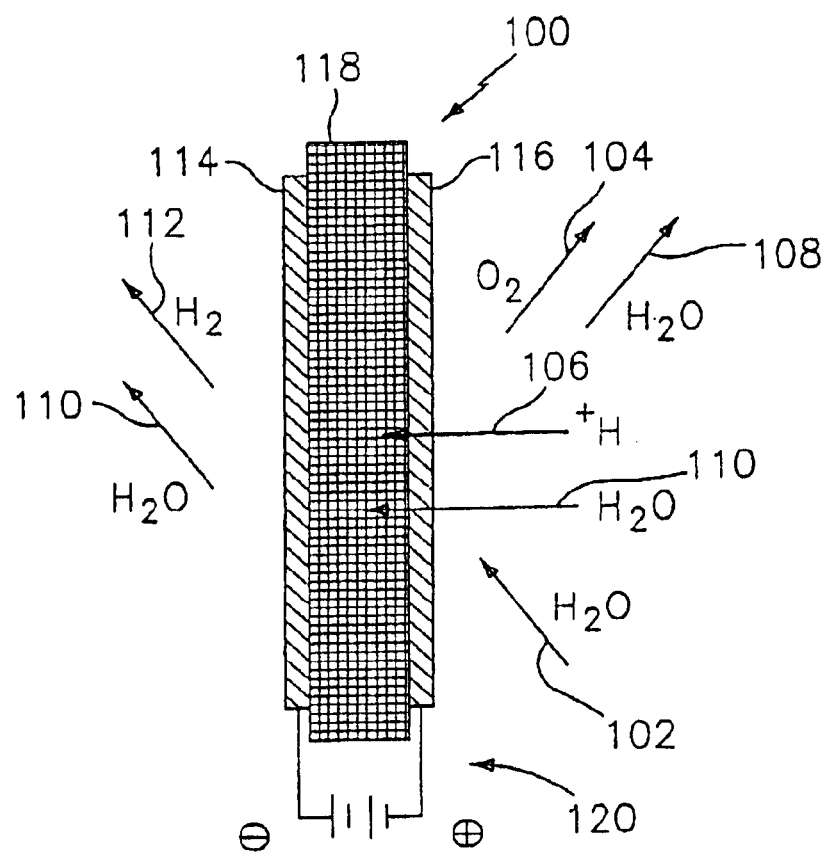
FIG. 1 is a schematic diagram illustrating a prior art electrochemical cell.

A regenerative electrochemical cell system (herein also referred to as "regen-system") is described, comprising an electrolysis module and a fuel cell module. This regen-system can maintain an uninterrupted power supply to numerous applications, including residential and commercial. Some possible commercial applications include telecommunications industry (e.g., outside plants, cell towers, and the like), computers (e.g., individual computers, a network of computers, and the like) individual businesses, office parks, cable (e.g., telephone, internet, and the like), the power grid, and the like. Some possible residential uses include individual homes, neighborhoods, villages, and the like. This regen-system can also be employed to enable peak-shaving, i.e., during peak usage times, various units can be engaged to supply power to a given area (home, community, commercial entity/group, etc.), such that the grid power can be re-directed to other areas needing additional power. For example, a telecommunication company can sell power from their cell tower back-up regen-system to the power company, thereby supplying the neighborhood located near the cell tower. Since the cell tower back-up regen-system typically remains idle (e.g., the regen-system is idle for greater than 98% of the time the regen-system is at the cell tower site), the power company is assisted with local power, the consumers avoid blackouts/brownouts, and the telecommunication company generates revenue from an otherwise idle system.

Use of the regen-system in a peak-shaving mode would entail operable communications between the regen-system (e.g., the owners/operators of the regen-system, and/or directly in operable communication with the regen-system) and the power grid, operable communication between the grid operators and the regen-system, and other various centralized or distributed utility control and monitoring systems. The regen-system may also be connected to utility systems responsible for metering and billing functions for the purpose of revenue reconciliation. Peak-shaving may be performed as a method to assist the main power source in time of high demand or, alternately, may be advantageously used more often whenever the cost of peak versus non-peak energy will provide the regen-system owner with a net-positive revenue source. In operation, the operator would engage (turn on), remotely or manually, the regen-system such that electricity would be supplied from the regen-system to a desired area, for a desired period of time or until regeneration the of the regen-system is needed to replenish various reactants (e.g., hydrogen). Note, regeneration during electricity production is also possible.

During operation of the regen-system, i.e., when power is desired, hydrogen gas (e.g., from a hydrogen storage) and oxygen gas (e.g., from the surrounding atmosphere, from the oxygen/water storage device, or from an oxygen storage, as well as from combinations comprising at least one of the foregoing oxygen sources) are supplied to the fuel cell module. Within the fuel cell, hydrogen ions, formed at the anode, migrate across the electrolyte to the cathode where they react with oxygen to form water. Meanwhile the electrons, released during the hydrogen ion formation, pass through an external load, producing electricity (i.e., power). The water produced at the cathode, can be vented to the atmosphere or passed through a phase separator to recover the water, prior to venting the oxygen, nitrogen, and any other gases, to the atmosphere. The recovered water can be directed to a water storage device. Power generation will continue until the hydrogen source is exhausted or the power is no longer required. Reasons for ending power generation may include, for example, the restoration of the grid power, restoration of renewable energy sources (such as solar, wind, wave power, or the like), or the determination that peak-shaving is no longer cost effective or no longer required.

Regardless of whether power generation continues, once the amount of hydrogen in the hydrogen storage system decreases below a pre-determined level, the electrolysis module preferably engages to replenish the hydrogen supply. Preferably, hydrogen will be replenished whenever the hydrogen storage level is below full, and there is power available for the electrolysis operation. Hydrogen production comprises introducing water to the electrolysis cell. At the anode, the water is converted to hydrogen ions and oxygen. While the oxygen and excess water exit the electrolysis cell, the hydrogen ions, as well as some of the water, migrate across the electrolyte to the cathode where the hydrogen ions form hydrogen gas. The hydrogen gas is directed from the electrolysis cell to the hydrogen storage device. Optionally, all or a portion of the hydrogen gas can be employed directly in the fuel cell without being stored.

The oxygen exiting the electrolysis cell can be handled in various fashions, including venting directly to the atmosphere, passing through a phase separator, and storing part or all of the oxygen, as well as combinations comprising at least one of the foregoing options. Preferably, at least the water is recovered from the oxygen stream prior to venting to the atmosphere. Since the speed of the fuel cell reaching operating temperatures is directly proportional to the concentration of oxygen in the oxygen stream, optionally, a small amount of this oxygen can be stored in order to enable rapid start-up of the fuel cell (e.g., attaining operating temperature in less than or equal to about 5 seconds) from cold start (e.g., ambient temperature or at least a temperature below operating temperature). Alternatively, oxygen present in the vapor of the water storage device can be directed to the fuel cell during start up. It is especially preferred, for system simplicity, to pass the oxygen from the electrolyzer through a phase separator prior to venting to the environment, while the water from the phase separator is directed to the water storage device that is in fluid communication with the fuel cell during fuel cell start up.

Various techniques can be employed to reduce fuel cell module start-up time, e.g., in order to produce an essentially uninterrupted power supply to the power load (or device) which the regen-system is backing-up. Some of the techniques include: 1) introducing concentrated oxygen (e.g., a concentration greater than the oxygen concentration of the surrounding atmosphere (e.g., air)) to the fuel cell module from the oxygen/water phase separation device and/or from the water storage device; 2) heating the fuel cell module; 3) introducing reactants to the fuel cell module during "shut-down"; and the like, as well as combinations comprising at least one of the foregoing techniques. With respect to shut-down, e.g., when the fuel cell is not producing electricity for the power load, it can be maintained in a condition ready for operation. In this condition, reactants (hydrogen and oxygen) can be introduced to the fuel cell module accordingly, and optionally, an external voltage can be applied to the fuel cell module to inhibit reactant migration across the electrolyte. Alternatively, the fuel cell module can be maintained at an "idle" by introducing the reactants to the fuel cell module and producing power at a level sufficiently low to maintain the fuel cell module at near operating conditions (e.g., producing less than or equal to about 10 percent of nominal system power, i.e., at less than or equal to about 100 Watts in a system with a nominal power of about 1 kilowatt (kW)). Preferably, the start-up time is less than or equal to about 1 minute, with less than or equal to about 30 seconds more preferred, less than or equal to about 15 seconds even more preferred, less than or equal to about 1 second yet more preferred, and less than or equal to about 40 milliseconds especially preferred, e.g., to attain essentially "uninterrupted" power when the regen-system 1 is a back-up power supply.

In order to attain the "uninterrupted" power, a power-bridging device can also be incorporated into the regen-system to provide the energy flow to the load during the fuel cell startup. The bridging device can be, for example, a battery, a capacitor, a flywheel, or other energy storage device, as well as combination comprising at least one of the foregoing devices. Although the bridging device can operate for as long as desired, the operating time will preferably coincide with the fuel cell start-up time. For example if the fuel cell start up time is about 1 second, the bridging device will operate for the second during which the fuel cell is starting up. Optionally, the fuel cell module can continue to operate after the cease of power load demand for a period of time sufficient to recharge the power bridging device, during which time the electricity produced in the fuel cell module will be directed to the bridging device.

Introducing reactants (e.g., the hydrogen and the oxygen) to the fuel cell prior to operation (i.e., start-up), can be accomplished via a trickle flow of the reactants (e.g., a sufficient amount to reduce start-up time of the fuel cell module to less than or equal to about 1 minute), or can be an amount sufficient to maintain the fuel cell at greater than the temperature of the surrounding atmosphere such that fuel cell start-up is rapid. In this embodiment, a charge is preferably applied to the cell by an external power source (e.g., grid power, bridge device power, and the like) to control migration of the reactants across the electrolyte.

Heating the fuel cell module to attain a desired start-up time comprises utilizing waste heat from the electrolysis module while the electrolysis module resupplies the hydrogen storage device(s) with hydrogen. For example, waste heat in the oxygen/water exhaust from the electrolysis module can be recovered in the heater and directed to the fuel cell module. Alternatively, or in combination, various heat sources can be employed, e.g., a vortex tube, heaters, and the like. When the fuel cell module is heated, it can be heated to any temperature up to the fuel cell operating temperature, depending upon the desired start-up time.

Figure 2:
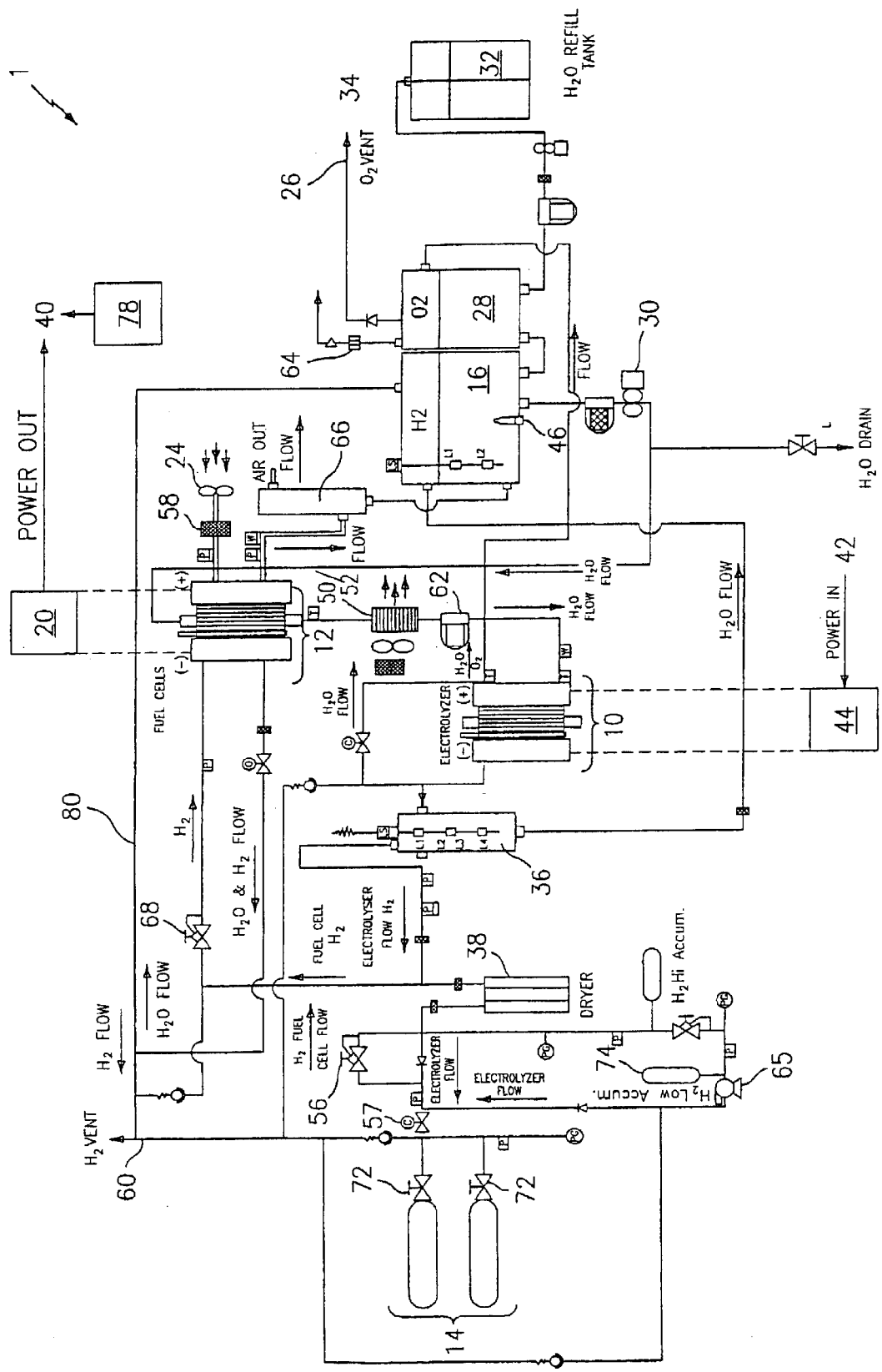
FIG. 2 is a schematic diagram representing a regenerative electrochemical cell system.

FIG. 2 is a block diagram representing one embodiment of an open-interface regenerative electrochemical cell system (regen-system) 1. The regen-system 1 comprises electrolysis module 10 in fluid communication with an oxygen-releasing vent 26 that communicates with the surrounding atmosphere 34. Optionally disposed between the electrolysis module 10 and the oxygen vent 26 is a water storage device 28. The water storage device 28 is in fluid communication with the water storage 16, which is in fluid communication with the cathode chamber of electrolysis module 10. On the anode side of the electrolysis module 10, hydrogen storage device(s) 14 is fluid communication with the electrolysis module 10, with an optional phase separation device 36 disposed therebetween. The hydrogen storage device 14 is further in fluid communication with the fuel cell module 12, preferably via dryer 38. Meanwhile, the fuel cell module is in fluid communication with the surrounding atmosphere 34 via oxygen/water phase separation device 66 and via water storage device 28 and oxygen vent 26. In addition, the fuel cell module 12 is in electrical communication with a power load 40 via an optional power conditioner 20 and optionally in electrical communication with a bridge power device 78, which is also in electrical communication with the power load 40. Meanwhile, the electrolysis module 10 is in electrical communication with a power source 42, optionally via a power conditioner 44. Optionally, power source 42 and bridge power 78 can comprise a single device.

The electrolysis module 10 can comprise any desired number of electrolysis cells, depending upon the desired rate of hydrogen production. Each electrolysis cell comprises an electrolyte disposed between and in ionic communication with electrodes. One of the electrodes is in fluid communication with a water source (e.g., 16, 28, 32, a continuous water supply, or the like), while the other electrode is in fluid communication with the fuel cell module 12, preferably via a phase separation device 36 and the hydrogen storage device(s) 14.

The water source, e.g., water storage device 16, contains a water intake port and a water output port. The water intake port is in fluid communication with fuel cell module 12 and the output port is in fluid communication with water pump 30 that is in fluid communication with the electrolysis module 10. Depending upon the design of the water storage device, a single tank 16 can be employed to recover water from the hydrogen and the oxygen outlets from the fuel cell module 10, or water storage devices (16, 28) can be employed. Furthermore, depending upon the availability of make-up water for the system, a backup water storage 32 may also be employed. Alternatively, or in addition, the water storage device can optionally be in fluid communication with a continuous water source (e.g., a lake, a river, a municipal water supply, and the like, as well as combinations comprising at least one of the foregoing water sources).

Additionally, the water system (i.e., the water storage device(s), and fluid communication conduits) may comprise a heating system to increase the temperature of the water, thereby reducing fuel cell startup time. This heating system may include resistance heaters within and/or around the piping system and/or within the water storage device 16 (e.g., heater 46). The heating system, alternatively, may constitute both a heating system component and a plumbing system component, such as a tube heater that serves the dual function of being a piping connection. Alternately, the heater may be incorporated in an element of the fuel cell module 12 or the electrolysis module 10 in the form of an integrated components with the heating element forming part of an end plate or fluid communication section of the module. Alternatively, the heating method may utilize a radiant heating method such as an infrared source within the system or externally located. These heaters may be in the form of a mat, a tube, a coil, a rod style heater, and others, as well as combinations comprising at least one of these heaters. Alternately, the heater may be part of a thermal management or hydration sub-system whose fluid may be other than water based.

The heating system may further comprise freeze protection, as part of the above-described system or via additional components. Freeze protection can be attained by employing various insulative measures to minimize heat loss, isolation valves that allow draining of water from non-freeze tolerant components of the regen-system 1, such as water pump(s), and the like. Alternately, continuous water flow may be utilized with the heating system, and/or the heating system may utilize parasitic loads (e.g., heat generated by the water pump, control system electronics, and the like) to create the heat energy and prevent water freezing during low ambient temperature operation (e.g., −30° F.). The use of parasitic heat can be employed in combination with various controls, such as a temperature sensor, and the like, such that the pump may be operated continuously, or the pump can be operated intermittently based upon factors such as the actual water temperature.

Water pump 30, in fluid communication with both the water storage device 16 and the electrolysis module 10, can optionally allow two-way water flow. Therefore, during electrolysis module 10 recharge operations, water pump 30 can allow excess water that accumulates in the regen-system 1 to flow into water storage device 16, preventing flooding of the regen-system 1. This pump 30, which can be in fluid communication with the electrolysis module 10 via the fuel cell module 12, is preferably capable of discharging the desired water to the electrolyte module 10 at a pressure to enable efficient regen-system operation. For example, the water pump 30 is preferably capable of discharging water to the electrolysis module 10 at a pressure up to and exceeding about 2.1 megaPascals (MPa) (300 pounds per square inch (psi)) during fuel cell module 12 operation.

As with the water storage device 16 and the water pump 30, the hydrogen storage device(s) 14 is in fluid communication with the electrolysis module 10. The hydrogen storage device 14 comprises a hydrogen gas intake port and a hydrogen gas output port. The hydrogen gas intake port is in fluid communication with electrolysis module 10, while the hydrogen gas output port is in fluid communication with the fuel cell module 12.

Within the hydrogen storage device, the hydrogen may be stored at various pressures, depending upon the hydrogen storage device 14 design and the storage needs of the regen-system 1. Preferably, the hydrogen storage device 14 is a pressurized device suitable to store hydrogen gas at pressures of up to, or exceeding, about 2,000 pounds per square inch (psi) with capability of storing hydrogen gas at pressures of up to, or exceeding about 10,000 psi more preferred.

The desired hydrogen storage pressure may be achieved through the use of the electrolyzer alone or in concert with a pressure boosting system (e.g., a compressor 65) within the regen-system 1. Alternatively, or in addition, the storage device may include mechanical or other pressure increasing methods, including metal hydride pumping or proton exchange membrane (PEM) based pumping systems. Any pumping system may use a single stage or multiple stages to achieve final compression level. The compression techniques may be used in various combinations or quantity to achieve the required compression within the system.

In an alternative to employing pressurized the hydrogen storage device(s) 14, the device can employ other techniques of storing hydrogen; e.g., hydrogen can be stored in the form of a gas, solid, or liquid. For example, if a pressurized device is employed, the hydrogen can be stored as a compressed gas. If a non-pressurized device is employed the hydrogen can be stored as a solid, e.g., as a metal hydride, in a carbon based storage (e.g. particulates, nanofibers, nanotubes, or the like), and others, as well as combinations comprising at least one of the foregoing storage forms.

Hydrogen storage device 14 can be formed of any material capable of withstanding the desired pressures. Some possible materials include ferrous materials (such as steel, e.g., stainless steel, and the like) titanium, carbon (e.g., woven carbon fiber materials, and the like), plastics, any other comparable high-strength materials, as well as composites, alloys, and mixtures comprising at least one of the foregoing materials. Furthermore, the device 14 maybe lined with sealant(s), surface finish(es), coating, or the like, to prevent corrosion or other tank material-related contamination from communicating with the hydrogen or any condensate in the device, and to prevent the contamination of regen-system components.

Hydrogen gas drying techniques may be employed as part of a hydrogen storage system. These drying systems may include, for example, desiccant based drying schemes (e.g., a swing bed adsorber, and other desiccant based absorbers), phase separators, membrane drying systems (e.g., palladium diffusers, and the like), coalescing filters, condensing systems (e.g., utilizing thermal electric cooler, vortex tube coolers, vapor or air cycle refrigeration system, and the like), and the like, as well as combinations comprising at least one of the foregoing drying systems.

Figure 3:
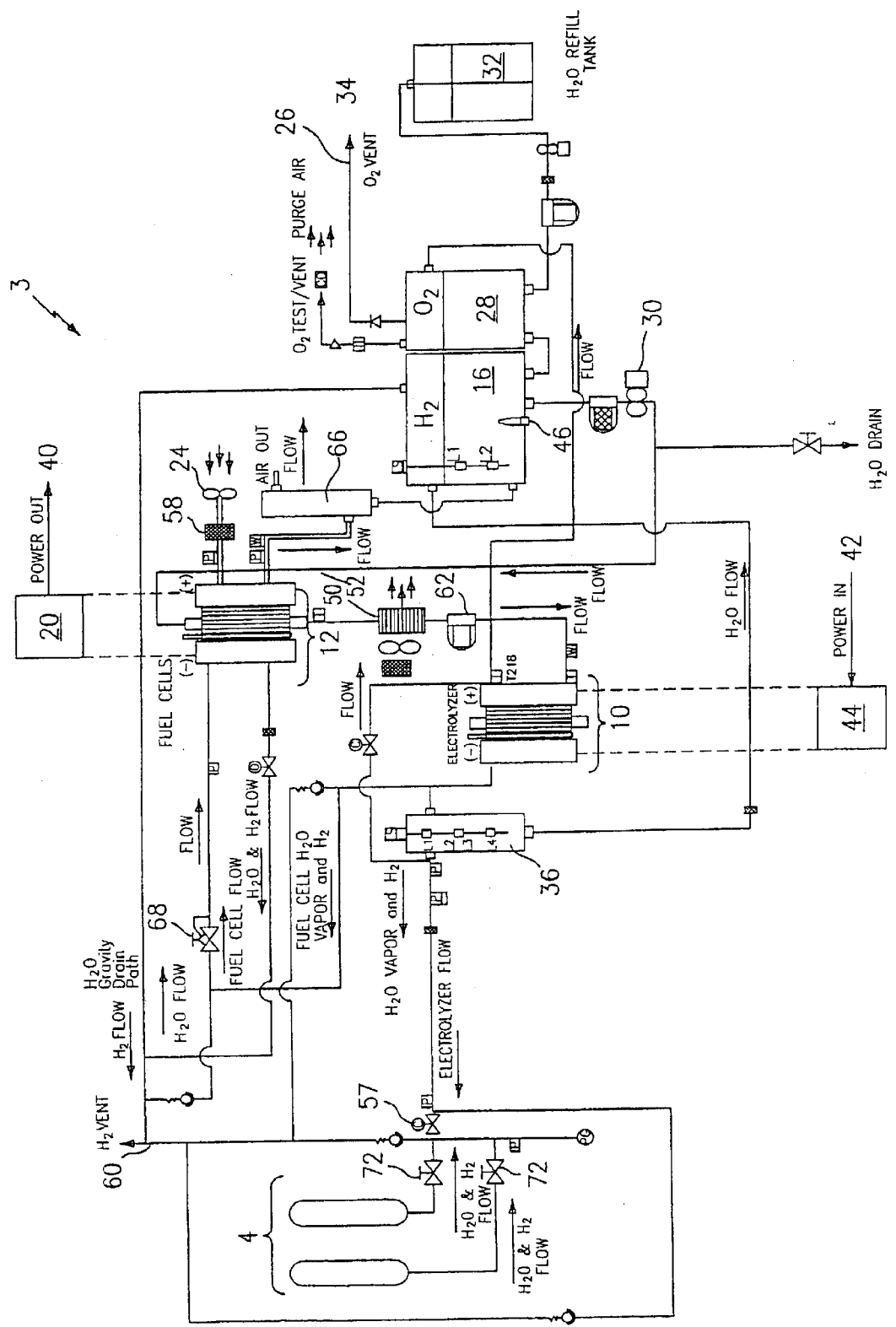
FIG. 3 is a schematic diagram representing another regenerative electrochemical cell system.

Optionally, the hydrogen storage system can comprise an inverted hydrogen storage device (i.e., a hydrogen storage device comprising a bi-directional opening (inlet and outlet), and/or which allows hydrogen removal from an upper vessel connection, while water is removed via a gravity drain port (see item 4 in FIG. 3). In the inverted hydrogen storage device, the device is allowed to collect condensed moisture and return this condensed liquid to the water storage device (s) 16 or other water sub-system components. Alternatively, the inverted hydrogen storage device can be used as a secondary water separator when used with a primary water separator, e.g., hydrogen/water phase separation device 36 (which may comprise multiple stages of separators to improve water extraction and recovery). Employing the inverted hydrogen storage device 4 eliminates the need for a dryer and associated hardware. Further eliminated is the need for a compressor 65 if the electrolysis module 10 is operated to produce hydrogen at a desired storage pressure.

In fluid communication with the hydrogen storage device 14 are optional dryer(s) 38, and the fuel cell module 12. The dryer 38 can comprise any device capable of removing water vapor from the hydrogen stream. Some water is removed from the saturated hydrogen stream at the phase separator 36. Saturated hydrogen gas from the phase separator then flows into dryer 38 (having a lower water saturation than the feed stream to separator 36). The dryer 38 includes a bed of a moisture absorbent (and/or adsorbent) material, i.e., a desiccant. As the saturated hydrogen gas flows into the dryer 38, water with trace amounts of hydrogen entrained therein is removed and subsequently returned to the water source through a low-pressure hydrogen separator 74. Low pressure hydrogen separator 74 allows hydrogen to escape from the water stream due to the reduced pressure, and also recycles water to the water source at a lower pressure than the water exiting the phase separation device 36. Alternatively, a diffuser may be provided in addition to the dryer 38, with a one-way check valve 72 preferably disposed between the storage device 36 and the dryer 38 to prevent high pressure backflow of the hydrogen gas.

Although the dryer 38 is preferably sized to hold all moisture generated during electrolysis based on the size of the hydrogen storage system, the dryer 38 has limited capacity for water removal. The dryer 38 is therefore preferably periodically purged to remove accumulated moisture. Purging the dryer 38 is accomplished by flowing stored hydrogen gas from the hydrogen storage device 14 through the dryer bed. As the hydrogen gas from hydrogen storage device 14 flows through the dryer 38, the dryer bed is purged of its moisture. A first pressure regulator 56 is fluidly connected between the storage hydrogen storage device 14 and the dryer 38. The pressure regulator 56 reduces the gas pressure from the storage hydrogen storage device 14 to provide an efficient and low cost solution for purging the dryer 38. The use of the first pressure regulator 56 minimizes the amounts of hydrogen gas vented (lost) to the atmosphere and provides a more efficient process for bed desorption. Moreover, the use of the first pressure regulator 56 prevents high-pressure gas exposure to the phase separator 36 from hydrogen storage device 14. As will be discussed in greater detail, the pressure regulator 56 is preferably set at or about the operating pressure for the fuel cell module 12. More preferably, the pressure is set a few pounds per square inch greater than the operating pressure for the fuel cell module 12. Preferably, the pressure regulator 56 is set at a pressure of less than or equal to 10 psi greater than the fuel cell operating pressure, with a pressure of less than or equal to 7 psi more preferred. Also preferred is a pressure of greater than or equal to about 2 psi greater than the fuel cell operating pressure, with a pressure of greater than or equal to about 3 psi more preferred.

The purging process comprises passing the reduced pressure hydrogen through the dryer and desorbing the absorbed (and adsorbed) water. The hydrated hydrogen can either be vented to the atmosphere, and/or all or a portion of the hydrated hydrogen can preferably be directed to the fuel cell for consumption and possibly subsequent water recovery. Preferably, the dryer 38 acts as a hydrogen humidification device to inhibit fuel cell electrolyte dry-out. Alternately, the vented hydrated hydrogen may be consumed in a combustion or a catalytic burner, or the like.

The fuel cell stack 34 is used to generate energy during a power generation mode. During the power generation mode, a control valve (not shown) is actuated (and preferably left open while in idle mode), and hydrogen gas flows from the storage device 36 to the fuel cell stack 34. Hydrogen gas electrochemically reacts with $O_2$ in the fuel cell module 12 to release energy and form by-product water. This water is preferably retained in the system 30. The oxygen gas can be either stored as pressurized gas or supplied from ambient air. A second pressure regulator 68 is fluidly connected to the fuel cell inlet. The pressure regulator is set at the optimal operating pressure of the fuel cell. Preferably, the second pressure regulator 68 is set at about 40 psi. The pressure regulator 68 protects the fuel cell from the high pressures obtained during hydrogen gas generation (pressures up to and exceeding about 4,000 psi) and acts as a secondary pressure reducer. The regulator 68 also serves as a redundant mechanism in the event of a check valve fault or leak.

As previously discussed, pressure regulator 56 is preferably set at a pressure rating above the rating for regulator 68 (e.g., a few psi greater than the pressure rating for regulator 68). Under these conditions, the pressure regulator 56 can function as a backup to pressure regulator 68 in the event of a "wide open" fault of regulator 68. Moreover, since pressure regulator 56 is set at a value greater than the regulator 68, pressure is continuously maintained to the fuel cell module 12, even during electrolysis. Since it is preferred to employ no shutoff or multi-way valves between the hydrogen storage device 14 and fuel cell module 12 that need to be actuated, the fuel cell is always ready to operate. A shutoff valve 57, normally disposed between the hydrogen storage device 4,14 and the dryer 38, is open when the regen-system 1 is operational; it is only closed for system faults or system shutoff. As a result, the switching delays caused due to valve actuation are eliminated as the regen-system 1 cycles between the charging/storage mode (e.g., hydrogen generation) and the power generation mode. During the power generation mode, the use of pressure regulator 56 causes a low pressure purging gas to flow into dryer 38 and desorb the bed of accumulated moisture. This permits the regen-system 1 to employ lower cost phase separators 38 and to optionally eliminate the check valves at the separator outlet. Use of the low pressure phase separator is particularly preferred when the system employs a hydrogen pressure boosting system (e.g., a compressor or the like), due to its low cost.

From the dryer 38, hydrogen flows to the fuel cell module 12. The fuel cell module 12 comprises any desired number of fuel cells, based upon the desire power supply capabilities of the regen-system 1. Each fuel cell comprises an electrolyte disposed between and in ionic communication with two electrodes. One electrode is in fluid communication with a hydrogen supply (e.g., hydrogen storage device 4,14 and/or electrolysis module 10), while the other electrode is in fluid communication with an oxygen supply (e.g., the surrounding atmosphere 34, the gaseous phase of the water storage device 28, the gaseous phase of the oxygen/water phase separation device 66, and/or an oxygen storage device (not shown)).

If the fuel cell module is in fluid communication with the surrounding atmosphere, reduction of any pressure differentials between the fuel cell module 10 and the surrounding atmosphere 34, as well as uptake of air from the surrounding atmosphere 34, and filtering of the air, can be accomplished by various methods, including, for example, using an air compressor(s), fan(s) 24, filter(s), and the like, as well as combinations comprising at least one of the foregoing. Air compressor 24 contains an air intake port and an air output port. The output port is in fluid communication with fuel cell module 12 and the intake port is in fluid communication with the surrounding atmosphere 34. Air compressor 24 allows air to be drawn from the surrounding atmosphere 34, compressed, and then supplied to fuel cell module 12 as compressed air. The generation of compressed air by air compressor 24 facilitates air uptake by fuel cell module 12.

In electrical communication with the fuel cell module 12 is a power load 40. The power load 40 can be a direct current (DC) load or an alternating current (AC) load and can include those discussed above, e.g., residential, commercial, and the like (including batteries for powering those power loads) with the electricity from the fuel cell module 12 appropriately conditioned by power conditioner 48. Furthermore, the system 1 can be connected directly to the load with sensors capable of drawing power upon the various conditions, e.g., cease of grid power flow, increased power demand over a predetermined amount, operation for system testing, commands from centralized or distributed control systems (e.g., connected via various methods including wireless, wired (e.g., modem, and the like)), infrared and radio frequency commands, and the like, as well as combinations comprising at least one of the foregoing command systems. These command systems may further include operations devices in operable communication with the regen-system, such as communication devices and control devices. Possible operations devices include processing units (e.g., computers, and the like) and similar equipment.

In contrast to the fuel cell module 12, the electrolysis module 10 is connected to a power source 42. The power source can be any device capable of providing sufficient power to the electrolysis module 10 to enable the desired hydrogen production rate. Some possible power sources 42 include grid power, solar power, hydroelectric power, tidal power, wind power, and the like, as well as combinations comprising at least one of the foregoing power sources (e.g., via solar panel(s), wind mill(s), dams with turbines, and the like).

The power sources can introduce either AC or DC power to the system 1, preferably via a power conditioner 44. The power conditioner may provide control of the energy source, e.g., current control, voltage control, switch control, as well as combinations of these controls, and the like. The power conditioner 44, and/or the control system (not shown), can monitor voltage, current, or both, in order to control the power from the power conditioner 44.

In addition to the power that passes out of the regen-system 1 via the power load 40, heat energy may be recovered from the regen-system 1 with a heat exchanger 50 and/or radiator 52. The heat exchanger can be disposed in fluid communication with both the fuel cell module 12 and the electrolysis module 10 such that the heat produced in the electrolysis module 10 can be employed to heat the fuel cell module 12. Alternatively, or in addition, the heat exchanger can be in thermal communication with the surrounding environment, or can be directed to a thermal load; e.g., a building (such as an office building(s), house(s), shopping center, and the like).

In addition to the above equipment, the system may further comprise various other equipment, such as valves (e.g., relief valves, check valves, manual valves, actuated valves, needle valves, and the like, as well as combinations comprising at least one of the foregoing valves), filters (e.g., deionization bed cartridge(s), filter cartridge(s), and the like, as well as combinations comprising at least one of the foregoing filters), sensors (e.g., pressure, temperature, flow, humidity, conductivity, gas mixture, water level, and the like, as well as combinations comprising at least one of the foregoing sensors), controls (e.g., temperature (such as, heaters, heat exchangers, coolers, dryers, and the like), pressure (such as, compressors, and the like), flow (such as, pumps, fans, blowers, and the like), power, and the like, as well as combinations comprising at least one of the foregoing controls), conduits (e.g., fluid conduits, electrical conduits, and the like), and the like, as well as combinations comprising at least one of the foregoing equipment. It should be noted that, depending upon regen-system location (remote, metropolitan, industrial, and the like), its specific function (e.g., front line electrical production, backup production), and the criticality of the source that the regen-system is backing-up, redundant components or merely additional components can be employed, in parallel or series operation. For example, water storage devices, dryers, heat exchanger, radiators, deionization beds, filters, phase separation devices, and the like.

The process by which the regenerative electrochemical cell system is operated will now be described. Stored hydrogen from hydrogen storage device 14 is fed into fuel cell module 12, preferably via pressure regulator 56 and dryer 38. Air from the surrounding atmosphere is directed to the fuel cell module 12 via filter 58 and fan 24. Optionally, the air can be compressed prior to entering the fuel cell module to attain the desired air pressure. Within the fuel cell module 12, the hydrogen and the air react to generate electricity, and by-product water. The electricity is directed from the regen-system 1 to the power load 40 through power conditioner 20. Meanwhile, cathode exhaust, i.e., excess air and product water are directed to the water storage device 28 via the phase separation device 66. Optionally, the oxygen separated from the water/air stream, can be retained for use in the fuel cell module 12 (e.g., to reduce start-up time), or can be vented via vent 26 to the surrounding atmosphere 34. Similarly, the hydrogen and water from the fuel cell anode exhaust is directed from the fuel cell to a water storage 16, with excess hydrogen, as well as nitrogen that may have migrated across the electrolyte, optionally being vented via vent 60.

To enhance the water recovery, i.e., to minimize this water loss, one or more dehumidifiers can be added to the regen-system 1. The dehumidifier serves to re-condense and hence recapture water vapor prior to venting. In one embodiment, in addition to the dryer 38, a dryer 64 can be employed. Whereas the dryer 38 is disposed in fluid communication with the hydrogen storage device, the electrolysis module 10, and the water storage device 16, the dryer 64 is in fluid communication with the water storage device 28. The optional dryer 64 enables the removal of water vapor from the oxygen purge stream that may also comprise other air components (e.g., nitrogen, carbon dioxide, and the like).

Dehumidification of vented water may also be utilized on the air/water stream from the cathode side of the fuel cell module 12 to preserve total system water volume. This dehumidification would take place on the outlet of the fuel cell at the exhaust air port. In one embodiment, a separate phase separator (e.g., an air/water phase separator 66) may collect recovered water. The water can then be pumped or gravity fed to the electrolysis module 10. Alternatively, all or a portion of the recovered water, may be directed to the water storage device 16.

The water reclamation system may partially or completely employ heat exchange with the surrounding atmosphere 34 (e.g., ambient air), may employ another fluid available to the regen-system 1, may create a cold condensing surface using active refrigeration (e.g., thermal electric cooler, air cycle refrigeration, vapor cycle refrigeration, and like), and the like, as well as combinations comprising at least one of the foregoing thermal transfer techniques. For example, the heat exchange may use pressurized air exiting the fuel cell by passing the air through a vortex tube cooler. As the air passes through the cooler, the air cools, producing a cold air stream and a hot air stream, wherein the hot air stream is vented to the surrounding atmosphere while the cold air steam is used to condense water in the air stream. The condensed water and air exiting the cooler is then separated in a water/air phase separator and the air is supplied to the vortex tube. The vortex tube generates both a hot and cold air source where the cold air source is used for condensation control and recovery, and the hot air source is typically vented. One example of the vortex tube is Exair Corporation Vortex Tube Model 3202 fitted with cold muffler model 3905 and hot muffler 3903; other options or combinations that yield the required cold air source may be used. Furthermore, the vortex tube can be used to recover water or merely for thermal exchange, e.g., to heat or cool the fuel cell, as desired. Since the vortex tube does not employ moving parts, it is a preferred technique for applications that do not have a high fluid flow rate (e.g., greater than or equal to about 150 cubic feet per minute (CFM)).

The reclaimed water, e.g., from the vortex tube, phase separation devices, and the like, is preferably directed to one of the water storage devices 16, 28. These water storage devices 16, 28 store the water and preferably provide phase separation to separate additional hydrogen or oxygen from the liquid water phase. The water storage device 16 preferably receives condensed water from the hydrogen/water phase separation device 36, from the oxygen/water phase separation device 66, and, from water in the hydrogen conduits (e.g., conduit 80), while the water storage device 28 preferably receives the water/oxygen stream exiting from the water electrode of the electrolysis module 10.

The fuel cell module 12 operates until the hydrogen source is depleted or other control system inputs indicated that power 40 generation is no longer desired. When power 42 is available, or when power 40 generation is desired (e.g., in peak-shave type applications), the electrolysis module 10 can be operated to provide hydrogen directly to the fuel cell module 12 or to replenish the hydrogen storage device(s) 4,14. Electrolysis module operation comprises directing water to the electrolysis module 10. Water can be introduced to the electrolysis module 10 directly from the water storage device 16, or can be introduced to the electrolysis module 10 via the fuel cell module 12. Preferably, water from the water storage device 16 passes through the fuel cell module 12, as a coolant, and into a heat exchanger/radiator 50/52. From the heat exchanger/radiator 50/52, the water passes through an optional deionization bed 62 and to the water electrode of the electrolysis module 10. In the electrolysis module 10, the power supplied to the electrolysis cell via power source 42 and optional power conditioner 44 enables the disassociation of the water to hydrogen ions and oxygen gas. The oxygen gas, along with excess water are directed to the oxygen/water phase separation device 66, while the hydrogen ions, and some water, migrate across the electrolyte to the hydrogen electrode where the hydrogen ions form hydrogen gas. From the electrolysis module 10, the hydrogen gas and water can be directed to an optional hydrogen/water phase separation device 36, and then the hydrogen can either be directed to the fuel cell module 12 or to an optional dryer (e.g., dehumidifier, dessicant or the like) 38 and into the hydrogen storage device(s) 4, 14. Depending upon the desired storage pressure of the hydrogen and the hydrogen side pressure of the electrolysis module 10, a compressor 65 may optionally be employed to increase the hydrogen pressure prior to introduction to the hydrogen storage device. Additionally, pressure reducing devices and associated accumulation devices may be used to stabilize and regulate to inlet pressure to the compressor.

The regenerative electrochemical cell system described herein can be employed as a power back up unit without the requirement of bulk oxygen storage, thereby simplifying the system, and reducing the system overall size. Removing capacity limitations allows the system to be used in practical applications such as large-scale energy production. Further, the system described is regenerative in the sense that the hydrogen gas needed for operation is supplied by the system eliminating the need for costly and time-consuming additions of hydrogen-generating reactants. This system effectively allows for efficient, practical, long-term use.

Due to the flexibility and environmental compatibility of the regen-system, it can be employed anywhere from in metropolitan areas to remote, e.g., third world locations. This system can employ any power source (e.g., AC, DC, 24V, 48V, 120V, 240V, and the like), and can backup any power load (e.g., AC, DC, 24V, 48V, 120V, 240V, and the like). Additionally, the fuel cell module can be fueled directly by the electrolysis module, or, while the fuel cell is drawing fuel (hydrogen) from the hydrogen storage device, the electrolysis module can supply hydrogen to the hydrogen storage device. Additionally, in applications where water addition is practical, or where larger water storage is economically feasible, the backup power system can also supply hydrogen as a direct fuel source for various applications such as appliance fueling (e.g., laboratory equipment such as chromatographs, and the like), vehicle fueling (e.g., automotive, other transportation vehicles, and the like), or other applications where hydrogen is a reactant gas, feedstock, or fuel application, while the regen-system retains the primary function of an electrical power systems.

In addition to reduced size and storage requirements, the regen-system maximizes the utility of various components. For example, the dryer and/or the hydrogen/water phase separation device are employed to remove water from the hydrogen stream prior to storage to simplify storage, enhance capacity, and inhibit corrosion of the dryer/storage device, and to humidify the hydrogen stream prior to its introduction to the fuel cell module to inhibit electrolyte dry-out.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A regenerative electrochemical cell system, comprising:
   a fuel cell module comprising a fuel cell hydrogen inlet in fluid communication a hydrogen storage system, and a fuel cell oxygen inlet in fluid communication with both a first oxygen source and a second oxygen source, wherein the first oxygen source is from a surrounding atmosphere and the second oxygen source is from a gaseous portion of an oxygen/water phase separation device; and
   an electrolysis module in fluid communication with the fuel cell module.

2. A regenerative electrochemical cell system as in claim 1, further comprising a hydrogen/water phase separation system comprising a fluid inlet in fluid communication with an electrolysis hydrogen outlet, and a gas outlet in fluid communication with a fuel cell hydrogen inlet, wherein the hydrogen/water phase separation system comprises an inverted hydrogen storage device.

3. A regenerative electrochemical cell system as in claim 1, wherein the electrolysis module comprises an electrolysis water inlet in fluid communication with a first water storage device via the fuel cell module, and an electrolysis water outlet in fluid communication with a second water storage device.

4. A regenerative electrochemical cell system as in claim 1, further comprising a power source in electrical communication with the electrolysis module, wherein the power source comprises a power selected from the group consisting of solar power, hydroelectric power, tidal power, wind power, and combinations comprising at least one of the foregoing powers.

5. A regenerative electrochemical cell system as in claim 4, further comprising a power conditioner electrically disposed between and in electrical communication with the power source and the electrolysis module.

6. A regenerative electrochemical cell system as in claim 4, further comprising solar panels in electrical communication with the electrolysis module.

7. A regenerative electrochemical cell system as in claim 4, further comprising a wind mill in electrical communication with the electrolysis module.

8. A regenerative electrochemical cell system as in claim 1, further comprising a power conditioner electrically disposed between and in electrical communication with a power load and the fuel cell module.

9. A regenerative electrochemical cell system as in claim 1, further comprising an oxygen vent in fluid communication with the oxygen/water phase separation device and a surrounding atmosphere.

10. A regenerative electrochemical cell system as in claim 1, further comprising an operation device in operable communication with the system, wherein the operation device is selected from the group consisting of communication devices, control devices, and combinations comprising at least one of the foregoing operation devices.

11. A regenerative electrochemical cell system as in claim 1, wherein the hydrogen storage system comprises storage selected from the group consisting of metal hydride and carbon based storage, and combinations comprising at least one of the foregoing storage.

12. A regenerative electrochemical cell system as in claim 11, wherein the storage is in a form selected from the group consisting of particulates, nanofibers, nanotubes, and combinations comprising at least one of the foregoing forms.

13. A method for operating a regenerative electrochemical cell system, comprising:
   starting up a fuel cell module by introducing feed hydrogen from a hydrogen storage system to a fuel cell hydrogen electrode and introducing feed oxygen from an oxygen/water phase separation device to a fuel cell oxygen electrode, and reacting hydrogen ions with the feed oxygen to generate electricity and fuel cell water;
   once the fuel cell has attained operating conditions, ceasing the introduction of the feed oxygen, and introducing second oxygen from a surrounding atmosphere to the fuel cell oxygen electrode;
   directing the fuel cell water to a water storage device;
   introducing electrolysis water to an electrolysis water electrode, and introducing power to an electrolysis module, to produce refuel hydrogen and refuel oxygen; and
   directing the refuel hydrogen to the hydrogen storage system.

14. A method for operating a regenerative electrochemical cell system as in claim 13, further comprising directing the refuel oxygen to the oxygen/water phase separation device, and venting at least a portion of the refuel oxygen from the oxygen/water phase separation device to the surrounding atmosphere.

15. A method for operating a regenerative electrochemical cell system as in claim 13, further comprising cooling the fuel cell by directing coolant water from the hydrogen/water storage device through the fuel cell to the electrolysis water electrode.

16. A method for operating a regenerative electrochemical cell system as in claim 15, further comprising removing thermal energy from the coolant water prior to introducing the coolant water to the electrolysis water electrode.

17. A method for operating a regenerative electrochemical cell system as in claim 13, wherein the power is selected from the group consisting of solar power, hydroelectric power, tidal power, wind power, and combinations comprising at least one of the foregoing powers.

18. A method for operating a regenerative electrochemical cell system as in claim 17, wherein the power comprises solar power.

19. A method for operating a regenerative electrochemical cell system as in claim 13, further comprising separating refuel hydrogen and refuel water in the hydrogen storage system, and wherein the hydrogen storage system comprises an inverted hydrogen device.

20. A method for operating a regenerative electrochemical cell system as in claim 19, wherein the hydrogen storage device further comprises a combined liquid-gas connector in fluid communication with the fuel cell hydrogen electrode.

21. A method for operating a regenerative electrochemical cell system as in claim 19, wherein the hydrogen storage device further comprises a gas connection, and a gravity liquid connection.

22. A method for operating a regenerative electrochemical cell system as in claim 13, further comprising directing at least a portion of the refuel hydrogen through a hydrogen/water phase separation device and into the fuel cell module as the feed hydrogen.

23. A method for operating a regenerative electrochemical cell system as in claim 13, further comprising directing the electricity through a power conditioner and to a power load.

24. A method for operating a regenerative electrochemical cell system as in claim 23, wherein the power load is a commercial load selected from the group consisting of telecommunications, computers, individual businesses, office parks, cable, and combinations comprising at least one of the foregoing commercial loads.

25. A method for operating a regenerative electrochemical cell system as in claim 23, wherein the power load is a residential load is selected from the group consisting of individual home(s), neighborhood(s), village(s), and combinations comprising at least one of the foregoing residential loads.

26. A method for operating a regenerative electrochemical cell system as in claim 23, wherein the power load comprises a power grid.

27. A method for operating a regenerative electrochemical cell system as in claim 26, further comprising operating the system based upon electricity needs of the power grid.

28. A method for operating a regenerative electrochemical cell system as in claim 27, further comprising directing the electricity to a local power load and reducing grid power to the local power load.

29. A method for operating a regenerative electrochemical cell system as in claim 28, further comprising re-directing grid power to a remote power load.

30. A method for operating a regenerative electrochemical cell system as in claim 13, further comprising supplying at least a portion of the feed hydrogen to an external hydrogen consuming device.

31. A method for operating a regenerative electrochemical cell system as in claim 30, wherein the external hydrogen consuming device comprises a vehicle.

32. A method for operating a regenerative electrochemical cell system as in claim 31, further comprising introducing make-up water to the water storage device from a continuous water source.

33. A method for operating a regenerative electrochemical cell system as in claim 30, wherein the external hydrogen consuming device comprises an appliance.

34. A method for operating a regenerative electrochemical cell system as in claim 13, further comprising introducing make-up water to the water storage device from a continuous water source.

35. A method for operating a regenerative electrochemical cell system as in claim 13, further comprising introducing the feed hydrogen based upon a sensor signal of a cease in grid power.

36. A method for operating a regenerative electrochemical cell system as in claim 13, further comprising commencing the introduction of the feed hydrogen based upon a sensor signal of a cease in grid power flow.

37. A method for operating a regenerative electrochemical cell system as in claim 13, further comprising commencing the introduction of the feed hydrogen based upon a sensor signal of increased power demand over a predetermined amount.

38. A method for operating a regenerative electrochemical cell system as in claim 13, further comprising commencing the introduction of the feed hydrogen based upon a sensor signal of operation for system testing.

39. A method for operating a regenerative electrochemical cell system as in claim 13, further comprising remotely controlling the introduction of the feed hydrogen.

40. A method for operating a regenerative electrochemical cell system, comprising:
maintaining a fuel cell such that the fuel cell attains an operating temperature in less than or equal to about 1 minute;
introducing hydrogen to a fuel cell hydrogen electrode and oxygen to a fuel cell oxygen electrode;
forming hydrogen ions and electrons at the fuel cell hydrogen electrodes;
passing the electrodes electrons through an external load to the fuel cell oxygen electrode; and
reacting the hydrogen ions with the oxygen at the fuel cell oxygen electrode to form water.

41. A method for operating a regenerative electrochemical cell system as in claim 40, wherein the operating temperature is attained in less than or equal to about 30 seconds.

42. A method for operating a regenerative electrochemical cell system as in claim 41, wherein the operating temperature is attained in less than or equal to about 15 seconds.

43. A method for operating a regenerative electrochemical cell system as in claim 42, wherein the operating temperature is attained in less than or equal to about 1 second.

44. A method for operating a regenerative electrochemical cell system as in claim 43, wherein the operating temperature is attained in less than or equal to about 40 milliseconds.

45. A method for operating a regenerative electrochemical cell system as in claim 43, wherein maintaining the fuel cell further comprises heating the fuel cell.

46. A method for operating a regenerative electrochemical cell system as in claim 43, wherein maintaining the fuel cell further comprises introducing the hydrogen to the fuel cell hydrogen electrode and the oxygen to the fuel cell oxygen electrode.

47. A method for operating a regenerative electrochemical cell system as in claim 40, wherein maintaining the fuel cell further comprises applying an external voltage to the fuel cell.

48. A method for operating a regenerative electrochemical cell system as in claim 40, wherein maintaining the fuel cell further comprises producing less than or equal to about 10 percent of nominal system power.

49. A method for operating a regenerative electrochemical cell system as in claim 40, wherein maintaining the fuel cell further comprises producing hydrogen in an electrolysis module, recovering heat from an oxygen/water stream exiting the electrolysis module, and introducing the recovered heat to the fuel cell module.

50. A method for operating a regenerative electrochemical cell system as in claim 40, further comprising introducing bridge power to the external load during fuel cell startup.

51. A method for operating a regenerative electrochemical cell system as in claim 50, wherein the bridge power is supplied by a bridge device selected from the group consisting of a battery, a capacitor, a flywheel, and a combination comprising at least one of the foregoing devices.

52. A method for operating a regenerative electrochemical cell system as in claim 51, further comprising generating electricity with the fuel cell and directing the electricity to the bridge device.

53. A method for operating a regenerative electrochemical cell system as in claim 52, further comprising generating electricity with the fuel cell module for a sufficient period of time after the fuel cell module ceases supplying a power load to recharge the bridge device, and directing the electricity to the bridge device after a power supply from the fuel cell to a power load ceases.

54. A method for operating a regenerative electrochemical cell system, comprising:
  introducing feed hydrogen from a hydrogen storage device to a fuel cell hydrogen electrode and introducing feed oxygen to a fuel cell oxygen electrode;
  reacting hydrogen ions with the oxygen to produce water;
  introducing an oxygen/water stream from the fuel cell oxygen electrode through a vortex tube to produce a hot stream and a cool stream, wherein the hot stream has a higher temperature than the cool stream;
  introducing the cool stream to a phase separation device.

55. A method for operating a regenerative electrochemical cell system as in claim 54, further comprising venting the hot stream to a surrounding atmosphere.

56. An electrochemical regenerative cell system comprising:
  a first conduit in fluid communication with a hydrogen storage device and a dryer;
  a first pressure regulator disposed in the first conduit between the hydrogen storage device and the dryer, the pressure regulator capable of reducing a pressure of a gas stream discharged from the hydrogen storage device to the dryer;
  a second conduit in fluid communication with the fuel cell module and at least one of the hydrogen storage device and the dryer; and
  a second pressure regulator disposed in the second conduit, wherein a pressure rating for the first pressure regulator is equal to or greater than a pressure rating for the second pressure regulator.

57. A method for operating a regenerative electrochemical cell system, comprising:
  introducing water to an electrolysis water electrode and power to an electrolysis module, to produce refuel hydrogen and electrolysis oxygen;
  directing the refuel hydrogen through a hydrogen storage system consisting essentially of a hydrogen/water phase separation device and an inverted hydrogen storage device, wherein the refuel hydrogen passes from the electrolysis module, through the hydrogen/water phase separation device, past a shut off valve, and into the inverted hydrogen storage device as dried hydrogen;
  hydrating and fueling a fuel cell module by directing the dried hydrogen and inverted storage device water from the inverted hydrogen storage device through the hydrogen/water phase separation device, and to a fuel cell hydrogen electrode;
  introducing feed oxygen to a fuel cell oxygen electrode; and
  producing water and electricity.

58. A method for operating a regenerative electrochemical cell system, comprising:
  introducing feed water to an electrolysis water electrode and power to an electrolysis module, to produce refuel hydrogen and electrolysis oxygen;
  directing the refuel hydrogen through a hydrogen/water phase separation device and a dryer and into a hydrogen storage device at a pressure, wherein the dryer removes dryer water from the refuel hydrogen to form a dryer hydrogen;
  hydrating and fueling a fuel cell module by reducing the pressure of the dryer hydrogen to a reduced pressure, passing the dryer hydrogen through the dryer, and removing dryer water from the dryer to form a hydrated hydrogen;
  directing the hydrated hydrogen to a fuel cell hydrogen electrode of the fuel cell module;
  introducing feed oxygen to a fuel cell oxygen electrode; and
  producing water and electricity.

59. A method for operating a regenerative electrochemical cell system as in claim 58, wherein the reduced pressure of the dryer hydrogen is about 2 psi to about 10 psi greater than an operating pressure of the fuel cell module.

60. A method for operating a regenerative electrochemical cell system as in claim 59, wherein the reduced pressure of the dryer hydrogen is about 3 psi to about 7 psi greater than an operating pressure of the fuel cell module.

61. A regenerative electrochemical cell system, comprising:
  a fuel cell module comprising a fuel cell hydrogen inlet in fluid communication a hydrogen storage system, and a fuel cell oxygen inlet in fluid communication with both an oxygen source and with a gaseous portion of an oxygen/water phase separation device;
  an electrolysis module comprising an electrolysis water inlet in fluid communication with a first water storage device via the fuel cell module, and an electrolysis water outlet in fluid communication with a second water storage device; and a heat exchanger disposed in fluid communication with the fuel cell module and the electrolysis water inlet, such that at least a portion of the water passing from the fuel cell module would pass through the heat exchanger prior to entering the electrolysis water inlet.

62. A regenerative electrochemical cell system as in claim 61, wherein the heat exchanger comprises a radiator in thermal communication with a thermal load.

63. A regenerative electrochemical cell system as in claim 62, wherein the thermal load comprises a building.

64. A regenerative electrochemical cell system, comprising:
  a fuel cell module comprising a fuel cell hydrogen inlet in fluid communication a hydrogen storage system, and a fuel cell oxygen inlet in fluid communication with both an oxygen source and with a gaseous portion of an oxygen/water phase separation device, wherein the fuel cell oxygen inlet is capable of fluid communication with the oxygen source independent of fluid communication with the oxygen/water phase separation device; and
  an electrolysis module comprising an electrolysis water inlet in fluid communication with a first water storage device via the fuel cell module.

65. A regenerative electrochemical cell system, comprising:
  a fuel cell module comprising a fuel cell hydrogen inlet in fluid communication a hydrogen storage system, and a fuel cell oxygen inlet in fluid communication with both a first oxygen source and second oxygen source, wherein the fuel cell oxygen inlet is capable of fluid communication with the first oxygen source independent fluid of communication with the second oxygen source; and an electrolysis module comprising an electrolysis water inlet in fluid communication with a first water storage device via the fuel cell module, and an electrolysis water outlet in fluid communication with a second water storage device.

66. A regenerative electrochemical cell system as in claim 65, wherein the first oxygen source comprises an oxygen concentration greater than a surrounding atmosphere oxygen concentration.

67. A method for operating a regenerative electrochemical cell system, comprising:

starting up a fuel cell module by heating the fuel cell module; and introducing feed hydrogen from a hydrogen storage system to a fuel cell hydrogen electrode and introducing feed oxygen from an oxygen/water phase separation device to a fuel cell oxygen electrode when the fuel cell module is not producing electricity, wherein the feed oxygen comprises a feed oxygen concentration greater than a surrounding atmosphere concentration of oxygen; and reacting hydrogen ions with the feed oxygen to generate electricity and fuel cell water; and once the fuel cell has attained operating conditions, ceasing the introduction of the feed oxygen, and introducing second oxygen from the surrounding atmosphere to the fuel cell oxygen electrode.

* * * * *